US009678718B1

(12) United States Patent
Bienkowski et al.

(10) Patent No.: US 9,678,718 B1
(45) Date of Patent: Jun. 13, 2017

(54) ANALYZING INFORMATION ASSOCIATED WITH LOGIC

(75) Inventors: Joseph Bienkowski, East Longmeadow, MA (US); Pieter Johannes Mosterman, Framingham, MA (US); Ian Noell, Cambridge (GB); David Alexander McGaw, Waterbeach (GB)

(73) Assignee: The MathWorks, Inc., Natick, MA (US)

( * ) Notice: Subject to any disclaimer, the term of this patent is extended or adjusted under 35 U.S.C. 154(b) by 1365 days.

(21) Appl. No.: 13/316,233

(22) Filed: Dec. 9, 2011

(51) Int. Cl.
*G06F 9/44* (2006.01)
(52) U.S. Cl.
CPC ..................................... *G06F 8/20* (2013.01)
(58) Field of Classification Search
None
See application file for complete search history.

(56) References Cited

U.S. PATENT DOCUMENTS

| | | | | |
|---|---|---|---|---|
| 8,443,354 B1* | 5/2013 | Satish | ........................ | G06F 8/65 717/104 |
| 8,660,878 B2* | 2/2014 | Bernardini | ....... | G06Q 10/06311 700/105 |
| 8,694,958 B1* | 4/2014 | Potter | ........................ | G06F 8/35 717/104 |
| 8,812,276 B2* | 8/2014 | Aldrich | ..................... | G06F 8/10 703/2 |
| 8,874,598 B2* | 10/2014 | Spengler | ............. | G06F 11/3692 707/736 |
| 2006/0168565 A1* | 7/2006 | Gamma | .............. | G06F 11/3688 717/122 |
| 2008/0109790 A1* | 5/2008 | Farnham | ............. | G06F 11/3688 717/128 |
| 2008/0313618 A1* | 12/2008 | Broman | .................. | G06F 9/445 717/130 |
| 2010/0131940 A1* | 5/2010 | Jazdzewski | ............... | G06F 8/71 717/170 |
| 2013/0091492 A1* | 4/2013 | Mizrahi | ................ | G06F 11/368 717/124 |
| 2013/0227526 A1* | 8/2013 | Imrey | .................... | G06Q 10/10 717/122 |

\* cited by examiner

*Primary Examiner* — Isaac T Tecklu
(74) *Attorney, Agent, or Firm* — Harrity & Harrity, LLP

(57) ABSTRACT

In an embodiment, information associated with logic is acquired. The logic may have a changed portion and an unchanged portion. The information may include information associated with an execution of the logic. A filter is applied to the acquired information to identify information associated with the changed portion of the logic. A report may be generated based on the identified information.

20 Claims, 13 Drawing Sheets

310 —

```
0101: int CalcSQRT(int x)
0102: {
0103:    if (x < 0)  then
0104:    {
0105:       return(-1);
0106:    }
0107:    else
0108:    {
0109:       return (sqrt(x));
0110:    }
0111: }
```

320 —

```
0201: int Test01()
0202: {
0203:    int rc;
0204:    rc = CalcSQRT(4);
0205:    if (rc == -1) then
0206:    {
0207:       return(-1);
0208:    }
0209:    else
0210:    {
0211:       return (0);
0212:    }
0213: }
```

371a ⊙ Show entire stack
371b ⊙ Show only your code (code that you have checked in)
371c ⊙ Show only code that has changed since the last time this test passed

372

373a — *thfoo* No changes since last passed run
*thfoo.lvlTwo_newFeatureTest* No changes since last passed run
373b — *hfoo* Contains changes since last passed run!
*hFindVisibleItem* Not your code, no changes since last passed run 378    374

| tfoo.m (1)  | 1  | function test = tfoo (point)                              |
| tfoo.m (12) | 2  |     testparams.browser = figure;                          |
| tfoo.m (13) | 3  |     test = lvlTwo_newFeatureTest(test, testparams);       |
|             |    |                                                           |
| tfoo.m (32) | 4  |     function test = lvlTwo_newFeatureTest(test, testparams) |
| tfoo.m (39) | 5  |         closeHandle = hfoo(get(testparams.browser, 'Figure')); |
|             |    |                                                           |
| hfoo.m (1)  | 6  | function found = hfoo (f, itemToFind, newArg)             |
| hfoo.m (21) | 7  |     if nargin == 3 && newArg                              |
| hfoo.m (22) | 8  |         f = 'x';                                          |
| hfoo.m (26) | 9  |     end                                                   |
|             |    |                                                           |
| hfoo.m (27) | 10 |     if ischar(itemToFind)                                 |
| hfoo.m (29) | 11 |     end                                                   |
|             |    |                                                           |
| hfoo.m (32) | 12 |     menus = hFindVisibleItem(f, '-all');                  |

FIG. 3D

ANALYZING INFORMATION ASSOCIATED WITH LOGIC

BRIEF DESCRIPTION OF THE DRAWINGS

The accompanying drawings, which are incorporated in and constitute a part of this specification, illustrate one or more embodiments described herein and, together with the description, explain these embodiments. The patent or application file contains at least one drawing executed in color. Copies of this patent or patent application publication with color drawing(s) will be provided by the Office upon request and payment of the necessary fee. In the drawings:

FIGS. 3A-D illustrate example outputs/reports that may be generated from information associated with an execution of code;

DETAILED DESCRIPTION

The following detailed description refers to the accompanying drawings. The same reference numbers in different drawings may identify the same or similar elements. Also, the following detailed description does not limit the invention.

One or more embodiments of the invention may be implemented on one or more devices, such as computing devices. The one or more devices may be a system or part of a system. The one or more devices may include, for example, a desktop computer, laptop computer, client computer, server computer, mainframe computer, personal digital assistant (PDA), netbook computer, tablet computer, web-enabled cellular telephone, smart phone, or some other device.

Figure 1:
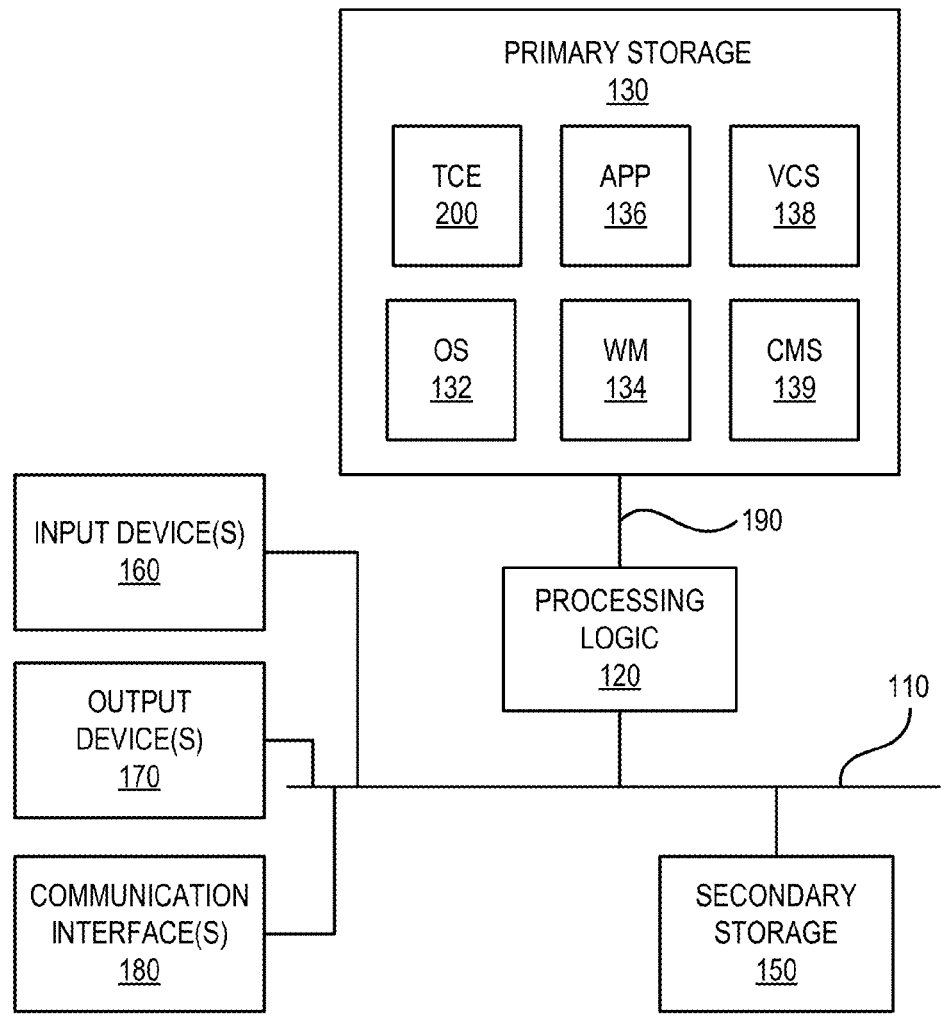
FIG. 1 illustrates a block diagram of an example of a computing device that may implement one or more embodiments of the invention.

FIG. 1 illustrates an example of a computing device 100 that may implement one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, that may be connected together by one or more buses, such as input-output (I/O) bus 110 and memory bus 190. It should be noted that computing device 100 is an example of a computing device that may implement one or more embodiments of the invention. Other computing devices that may be less complicated or more complicated than computing device 100 may implement one or more embodiments of the invention.

The I/O bus 110 may be an interconnect bus that may enable communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). Examples of processors that may be used to implement processing logic 120 include the Intel® Xeon® and Atom™ processors available from Intel Corporation, Santa Clara, Calif.

The secondary storage 150 may be accessible to the processing logic 120 via I/O bus 110. The secondary storage 150 may store data and/or instructions for the processing logic 120. The information may be executed, interpreted, manipulated, and/or otherwise processed by the processing logic 120. The secondary storage 150 may include, for example, a storage device, such as a magnetic disk, optical disk (e.g., CD-ROM, DVD player), random-access memory (RAM) disk, tape unit, and/or flash drive. The data and/or instructions may be stored on one or more non-transient tangible computer-readable media contained in the storage device. This media may include, for example, magnetic discs, optical discs, magnetic tape, and/or memory devices (e.g., flash memory devices, memristor devices, static RAM (SRAM) devices, dynamic RAM (DRAM) devices, or other memory devices). The stored data and/or instructions may include data and/or computer-executable instructions that may implement one or more embodiments of the invention.

Input devices 160 may include one or more devices that may be used to input information into computing device 100. Examples of devices that may be used to input information into computing device 100 may include a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device.

The information may include spatial (e.g., continuous, multi-dimensional) data that may be input into computing device 100, for example, using a device such as a computer mouse. The information may also include other types of data, such as, for example, text that may be input using a keyboard.

Output devices 170 may include one or more devices that may output information from the computing device 100. Examples of devices that may output information from the computing device 100 may include a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer, inkjet printer), speaker, video projector, volumetric display device, plotter, actuator (e.g., electrical motor), or some other output device.

Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations (e.g., graphs, block diagrams), pictures, text, or other information that may be presented by output devices 170. Note that the information may be presented on output devices 170 in a stereoscopic view to enable, for example, a perception of depth.

Communication interfaces 180 may include one or more devices that contain logic that may (1) interface the computing device 100 with, for example, one or more communication networks and (2) enable the computing device 100 to communicate with one or more devices connected to the communication networks. An example of a communication network that may be used with computing device 100 will be described further below with respect to FIG. 9.

Communication interfaces 180 may include one or more transceiver-like mechanisms that enable the computing device 100 to communicate with devices connected to the communication networks. Examples of communication interfaces 180 may include a built-in network adapter, network interface card (NIC), Personal Computer Memory Card International Association (PCMCIA) network card, Peripheral Component Interconnect (PCI) network adapter, PCI Express (PCIe) network adapter, Institute of Electrical and Electronics Engineers (IEEE) 1394 network adapter, wireless network adapter, Universal Serial Bus (USB) network adapter, modem, or other device suitable for enabling the computing device 100 to communicate with the communication networks.

The primary storage 130 is accessible to the processing logic 120 via bus 190. The primary storage 130 may be a non-transient tangible computer-readable media that may store information for processing logic 120. The information may include computer-executable instructions and/or data that may implement operating system (OS) 132, windows manager (WM) 134, an application (APP) 136, a version control system (VCS) 138, a configuration management system (CMS) 139, and/or a technical computing environment (TCE) 200. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on processing logic 120, managing primary storage 130, controlling access to various components associated with computing device 100 (e.g., secondary storage 150, input devices 160, output devices 170, communication interfaces 180), and controlling access to data received and/or transmitted by these components.

Examples of operating systems that may be used to implement OS 132 include the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, Microsoft Windows Mobile, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage one or more GUI elements, such as widgets, dialog boxes, and windows, that may associated with the OS 132, TCE 200, and/or APP 136. The GUI elements may be displayed on an output device 170. The GUI elements may include one or more graphs. The GUI elements may include one or more reports that may be generated by, for example, APP 132 and/or TCE 200. Generating the reports may include applying a filter to information associated with an execution of logic (e.g., a model, software).

The WM 134 may also (1) capture one or more positions of interactions with an input device 160 and/or other data associated with the input device 160, and (2) provide the positions and/or data to, for example, OS 132, APP 136, and/or TCE 200. The positions and/or data may be provided in messages that are sent to the OS 132, APP 136, and/or TCE 200.

Examples of window managers that may be used to implement WM 134 may include X windows, GNOME, Unity, and KDE, which are often used with the Linux operating system, and window managers used with the Microsoft Windows XP, Microsoft Windows Vista, Microsoft Windows Phone, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in one or more programming languages. The programming languages may include, for example, C, C++, JAVA, MATLAB® language, C#, JavaScript, LISP, Assembly, Haskell, or some other programming or scripting language. Some or all of APP 136 may be written by a user of computing device 100, supplied by a vendor, and/or generated by TCE 200. Some or all of APP 136 may operate (e.g., execute) under the control of OS 132 and/or TCE 200. APP 136 may include computer-executable instructions and/or data that may implement one or more embodiments of the invention.

VCS 138 may include provisions for maintaining versions of logic, such as, for example, modeling elements, code, or other logic. VCS 138 may maintain the versions in files. The files may store changes made to the logic since a previous version. Examples of version control systems that may implement VCS 138 may include, but are not limited to, AccuRev SCM from AccuRev, Inc.; Bazaar from Canonical Ltd.; BitKeeper from BitMover, Inc.; ClearCase, Synergy, and Rational Team Concert from IBM, Inc.; Code Co-op from Reliable Software; CVS; CVSNT from March Hare Software; Dimensions from Serena Software; Fossil; Git; GNU arch; IC Manage from IC Manage, Inc.; Integrity from Integrity a PLC Company; LibreSource Synchronizer from Artenum; Mecurial; Monotone; Perforce from Perforce Software, Inc.; Plastic SCM from Codice Software; SCM Anywhere and Sourceanywhere Standalone from Dynamsoft; StarTeam from Borland; Subversion (SVN) from the Apache Software Foundation; SVK from Best Practical; Team Foundation Server and Visual SourceSafe from Microsoft; and Vault from SourceGear, LLC.

CMS 139 may include a configuration management system that may be used to establish and maintain consistency of a product's performance, and/or its functional and/or physical attributes with the product's requirements, design, and operational information. CMS 139 may identify functional and physical attributes of the product at various points in time, and perform systematic control of changes to the identified attributes for the purpose of, for example, maintaining integrity and traceability throughout the product's development life cycle.

CMS 139 may trace changes in the product and verify that the product includes planned enhancements that are supposed to be included in the product's release. CMS 139 may implement various features that may include configuration identification, configuration control, configuration status accounting, and/or configuration audits.

Configuration identification may include identifying attributes that may define aspects of a configuration item. A configuration item may include a product (hardware and/or software) that has an end-user purpose. These attributes may be recorded in configuration documentation and baselined. Configuration change control may include a set of processes and/or approval stages that may be required in order to change a configuration item's attributes and to re-baseline them. Configuration status accounting may include the ability to record and report on the configuration baselines associated with a configuration item at, for example, a particular moment of time. Configuration audits may be broken into functional and physical configuration audits. They may occur either at delivery or at the moment of effecting a change to a configuration item. A functional configuration audit may ensure that functional and performance attributes of a configuration item are achieved. A physical configuration audit may ensure that a configuration item is installed in accordance with, for example, requirements of the configuration item's design documentation.

CMS 139 may implement and/or may be based on various standards. These standards may include, for example, ANSI/EIA-649-1998 National Consensus Standard for Configuration Management; EIA-649-A 2004 National Consensus Standard for Configuration Management; ISO 10007:2003 Quality management systems —Guidelines for configuration management, Federal Standard 1037C; GEIA Standard 836-2002 Configuration Management Data Exchange and Interoperability; IEEE Std. 828-1998 IEEE Standard for Software Configuration Management Plans; MIL-STD-973 Configuration Management; STANAG 4159 NATO Materiel Configuration Management Policy and Procedures for Multinational Joint Projects; STANAG 4427 Introduction of Allied Configuration Management Publications (ACMPs); CMMI for Development, Version 1.2 CONFIGURATION MANAGEMENT; and/or CMII—The Path to Integrated Process Excellence.

TCE 200 may provide a computing environment that may allow, for example, a user to perform tasks related to disciplines, such as, but not limited to, mathematics, science, engineering, medicine, business, biology, and finance. TCE 200 may use an array as a basic element, where the array may not require dimensioning. TCE 200 may support array-based programming where an operation may apply to an entire set of values included in an array. Array-based programming may allow array-based operations to be treated as high-level programming that may allow, for example, operations to be performed on entire aggregations of data without having to resort to explicit loops of individual non-array operations.

TCE 200 may include a programming language (e.g., the MATLAB language) that may be used to express problems and/or solutions in mathematical notations. The programming language may be used to program a script. The programming language may be dynamically typed and/or array-based. In a dynamically typed array-based programming language, (1) data may be contained in arrays and (2) data types of the data may be determined (e.g., assigned) at program execution time.

For example, suppose a program, written in a dynamically typed array-based programming language, includes the following statements:

A=[1, 2]
A=[1.1, 2.2, 3.3]

Now suppose the program is executed, for example, in a TCE, such as TCE 200. During program execution or run-time, when the statement "A=[1, 2]" is executed the data type of variable "A" may be a 1-by-2 array containing elements whose data type are integer. Later, when the statement "A=[1.1, 2.2, 3.3]" is executed, since the language is dynamically typed, the data type of variable "A" may be changed from the above 1-by-2 array to a 1-by-3 array containing elements whose data type are floating point. As can be seen by this example, data in a program written in a dynamically typed array-based computing language may be contained in an array. Moreover, the data type of the data may be determined during execution of the program. Thus, in a dynamically typed array-based programming language, data may be represented by arrays and data types of data may be determined at run-time. Moreover, in a dynamically typed array-based programming language arrays may be heterogeneous. For example, executing the statement:

A=[1, 2.0, 3.3]

may cause the data type of variable "A" to be a 1-by-3 heterogeneous array containing elements whose data types are a mix of integer (for element '1') and floating point (for elements '2.0' and '3.3').

TCE 200 may perform matrix and/or vector formulations that may be used for data analysis, data visualization, application development, simulation, modeling, and/or algorithm development. The matrix and/or vector formulations may be used in many areas, such as statistics, image processing, signal processing, control design, life sciences modeling, financial modeling, discrete event analysis and/or design, data flow analysis and/or design, control flow analysis and/or design, and state-based analysis and/or design.

TCE 200 may provide mathematical functions and/or graphical tools that may be used for creating plots, surfaces, images, volumetric representations, and/or other representations. TCE 200 may provide these functions and/or tools using toolboxes (e.g., toolboxes for signal processing, image processing, data plotting, parallel processing). In addition, TCE 200 may provide these functions as block sets. TCE 200 may also provide these functions in other ways, such as, for example, via a library, local or remote database, remote procedure calls (RPCs), and/or an application programming interface (API).

TCE 200 may provide an integrated development environment (IDE) that may be used to develop entities, such as for example, software, diagrams, interfaces, and/or models. The IDE may contain provisions for designing, writing, deploying, implementing, testing, compiling, executing, and/or debugging the entities.

Figure 2:
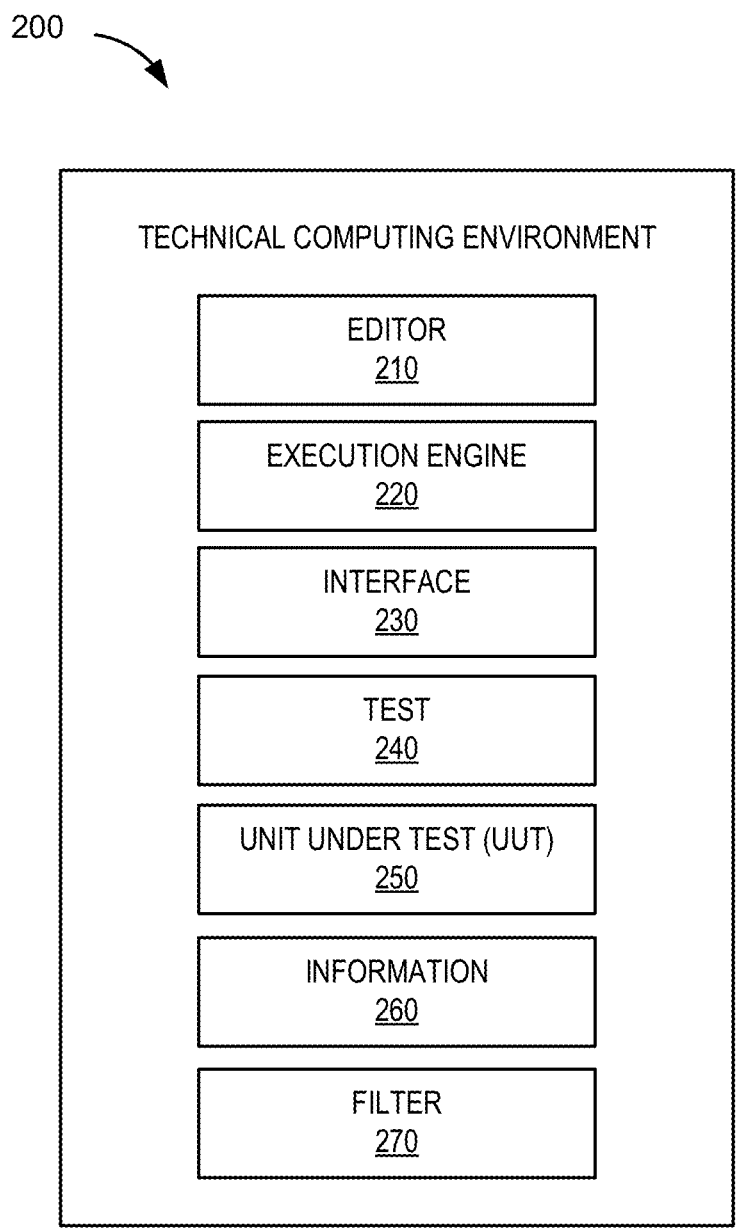
FIG. 2 illustrates a block diagram of an example of a technical computing environment (TCE) that may implement one or more embodiments of the invention.

FIG. 2 illustrates an example embodiment of TCE 200. Referring to FIG. 2, TCE 200 may comprise various components, which may include an editor 210, an execution engine 220, an interface 230, a test 240, a unit under test (UUT) 250, information 260, and a filter 270. Note that FIG. 2 illustrates an example embodiment of TCE 200. Other embodiments of TCE 200 may contain, for example, more components or fewer components than the components illustrated in FIG. 2. Moreover, in other embodiments of TCE 200, functions performed by the various components contained in TCE 200 may be distributed among the components differently, than described herein.

Examples of TCEs that may implement one or more embodiments of the invention may include, but are not limited to, MATLAB®, Simulink®, Stateflow®, Simscape™, SimMechanics™, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave and GNAT from the GNU Project; MATRIXx and Lab-View® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica and Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; Working Model 2D from Design Simulation Technologies, Inc.; Working Model from Design Simulation Technologies, Inc.; Computer Aided Three-dimensional Interactive Application (CATIA) and SolidWorks from Dassault Systems; Ptolemy from the University of California at Berkeley; Visual Studio from Microsoft; Eclipse from the Eclipse Foundation; JDeveloper and Netbeans from Oracle Corporation; ActiveState from ActiveState Software Incorporated; and IntelliJ IDEA from JetBrains S.R.O.

Editor 210 may be, for example, a block diagram and/or text editor that may allow a user, to specify, edit, annotate, save, publish, and/or print, some or all of test 240 and/or UUT 250. For example, UUT 250 may include a block diagram of a model and editor 210 may contain one or more provisions for displaying, specifying, editing, annotating, saving, publishing, and/or printing the block diagram. Note that editor 210 may contain provisions for specifying, editing, annotating, saving, publishing, and/or printing the block diagram graphically and/or textually.

The execution engine 220 may be used to execute UUT 250. Execution may include performing various computations that may be associated with a system represented by UUT 250. The computations may be performed based on information (e.g., geometric and/or topologic information) associated with one or more modeling elements contained in UUT 250. The computations may include, but are not limited to, computations of dynamics (e.g., differential equation behavior, difference equation behavior, discrete-event behavior), statics, equilibrium, mass, inertia, collision detection, collision response, and/or force fields associated with the system.

Interface 230 may enable, for example, commands, data, code, or other information to be entered into TCE 200. Interface 230 may allow the information to be entered textually (e.g., via a command line) and or graphically (e.g., via menus). For example, interface 230 may be a command line interface that may enable one or more data series to be entered by a user. Interface 230 may also enable the user to input one or more commands that may enable a user to (1) specify a filter, (2) apply the filter to information associated with UUT 250, and (3) cause a report to be generated based on a result of applying the filter. The report may be presented on an output device 170. Note that other techniques for (1) specifying a filter, (2) applying the filter to information associated with UUT 250, and (3) causing a report to be generated based on a result of applying the filter may be provided by TCE 200. For example, TCE 200 may incorporate a GUI that that may be used to provide some or all of these features.

Test 240 may include logic (e.g., code, modeling elements) that may be used to test UUT 250. The logic may be executed by the execution engine 220 to test UUT 250. Test 240 may be designed to exercise various paths through UUT 250. Information may be generated from executing test 240. This information may include information associated with testing UUT 250. For example, the information may include one or more errors that may have been detected by test 240 when exercising various paths through UUT 250. Moreover, the information may include, for example, coverage information that may indicate paths and/or truth values of logic clauses in UUT 250 that have been covered by test 240. Coverage information may include, for example, statement coverage, condition coverage, decision coverage, condition/decision coverage, modified condition/decision coverage (MC/DC), and/or table coverage.

UUT 250 may be, for example, a time-based graphical block diagram model, a state transition diagram, a discrete event model, an activity diagram, a Unified Modeling Language (UML) diagram, a sequence diagram, a data flow model, some other type of model or diagram, or code. For example, UUT 250 may be a software application that may be written in one or more programming languages. The programming languages may include, for example, C, C++, JAVA, MATLAB® language, C#, JavaScript, LISP, Assembly, Haskell, Perl, Python, SQL, Prolog, VHDL, ADA, APL, or some other programming language.

UUT 250 may represent a system, such as a physical system, a control system, a signal processing system, or some other system. UUT 250 may be graphical, textual, or some combination of graphical and textual. The system represented by UUT 250 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing systems, manufacturing systems, and a stock market.

The system represented by UUT 250 may have various execution semantics that may be represented in UUT 250 as a collection of modeling elements (e.g., blocks). A modeling element may generally refer to a portion of functionality that may be used in UUT 250. The modeling element may be graphically represented, however, it can be appreciated that the modeling element does not necessarily need to be represented graphically. For example, the modeling element may be a block that may be represented textually or stored in some form of internal representation. Also, a particular visual depiction used to represent a modeling element, for example in a graphical block diagram, may be an arbitrary design choice.

A modeling element may be hierarchical in that the modeling element itself may comprise one or more modeling elements that make up the modeling element. A modeling element comprising one or more modeling element (e.g., sub-blocks) may be referred to as a subsystem modeling element. A subsystem modeling element may represent a subsystem of the overall system represented by the model.

UUT 250 may contain provisions for outputting a plot of data. For example, UUT 250 may contain a modeling element (e.g., a scope block) that may output a graph that includes data that is input into the modeling element. The data may be input into the modeling element as one or more data series and the graph may include a plot of some or all of the data contained in the one or more data series.

Information 260 may include information about the UUT 250. Test 240 may be executed to verify paths in UUT 250. Verification may include executing the paths in UUT 250. Information 260 may include information associated with the execution of test 240 and/or the verified paths in UUT 250. Moreover, information 260 may include information associated with paths in UUT 250 that were not verified. In addition, information 260 may include information related to functions that may be defined outside of UUT 250 and/or test 240 that were called during the execution of test 240 and/or paths contained in UUT 250. Other information that may be included in information 260 may be related to one or more errors that may have been detected by test 240, exception conditions that occurred when testing UUT 250, breakpoints encountered in UUT 250, paths taken in UUT 250, warnings that occurred when testing UUT 250, or other information related to testing and/or executing some or all of UUT 250.

Filter 270 may be applied to information 260 to produce an output. The output may include and/or exclude information contained in information 260 in the output. As will be described further below, a report may be generated from the output.

Figure 3B:
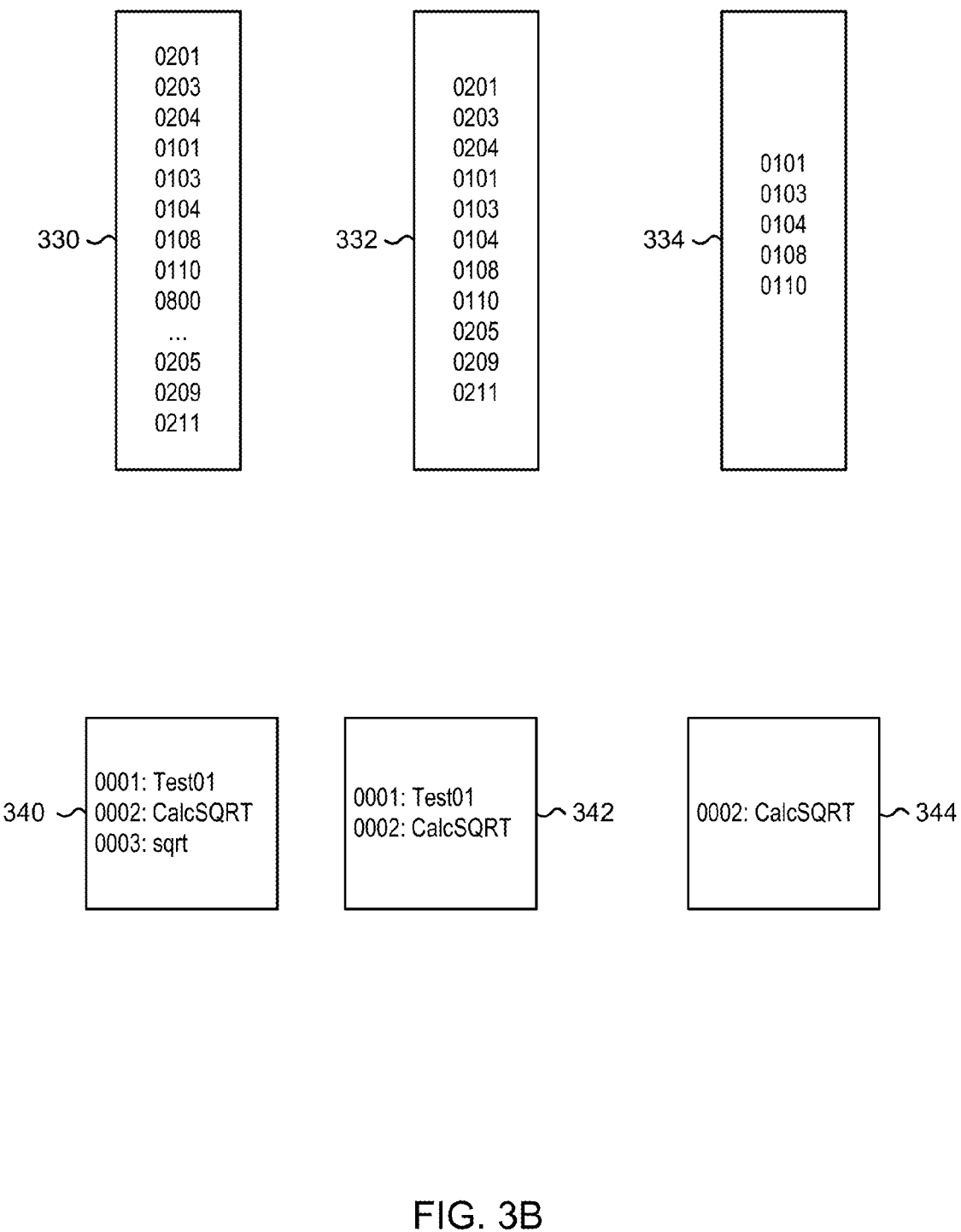

FIGS. 3A-D illustrate example outputs/reports that may be generated from information, such as information 260, associated with an execution of code. Referring to FIG. 3A, block 310 includes a first version of code that may be included in an embodiment of UUT 250 and block 320 includes code that may be included in an embodiment of test 240.

Specifically, block 310 includes a function called CalcSQRT. The function determines whether an input parameter is less than zero (line 0103) and if so returns "−1" to a caller of the function (line 0105). Otherwise, if the input parameter is not less than zero, the function calls a library routine named "sqrt" to calculate a square root of the input parameter. The result of this calculation is returned to the caller (line 0109).

Block 320 includes code that implements a test that may be used to test portions of the code in block 310. The test is named "Test01" (line 0201). The test calls the function "CalcSQRT" with an input parameter that has a value of "4" (line 0204). A value returned by the called function is placed in a variable named "rc". A check is performed to determine if the value of "rc" is set to "−1" (line 0205). If so, the test returns a value of "−1" to its caller (line 0207). Note that the caller may interpret this returned value as the test having failed, which the caller may treat as an error condition. If the value of "rc" is not set to "−1", the test returns a value of "0" (line 0211). Note that the caller may interpret this returned value as the test having passed, which the caller may treat as a "success" condition.

Note that in block 320, the input parameter that is passed in the call to function "CalcSQRT" is not less than zero. Thus, the path in function "CalcSQRT" that is tested by "Test01" includes lines 0101, 0103, 0107, and 0109 in "CalcSQRT".

FIG. 3B illustrates various outputs that may be produced from applying a filter to information associated with an execution of "Test01". Referring to FIG. 3B, block 330 illustrates an example of a path trace of that may be output from an execution of "Test01". The path trace may list line numbers associated with path of code that has been "visited" (e.g., executed in the execution) during the execution. Note that in the path trace, the line number for code associated with the library routine "sqrt" is "0800". This line number may be discerned, for example, from a link map that may be generated when producing an executable version of "Test01".

Block 332 illustrates an example of output that may be generated by applying a filter to the path trace illustrated in block 330. The output includes line numbers of code in the path trace that relates to "Test01" and "CalcSQRT". In this example, the filter may be designed to exclude from the output line numbers in the path trace that are associated with code that is not contained in either "Test01" or "CalcSQRT". Moreover, the filter may be designed to include only those line numbers in the path trace that are associated with code that is contained in either "Test01" or "CalcSQRT".

Block 334 illustrates an example of output that may be generated by applying a filter to the path trace illustrated in block 330 and/or the output illustrated in block 332. The filter used to produce the output in block 334 may be designed to output line numbers in the path trace and/or the output illustrated in block 332 that are associated only with lines of code contained in function "CalcSQRT".

Block 340 illustrates an example of a stack trace of functions that may be called in an execution of "Test01". The stack trace may reflect an order of the functions that are called during the execution. For example, as shown in block 340, function "Test01" may first be called then function "CalcSQRT" may be called followed by function "sqrt". Block 342 illustrates an example output that may be produced by applying a filter to the stack trace illustrated in block 340. In this example, the filter may include calls to code contained in non-library functions (e.g., "Test01" and "CalcSQRT") listed in the stack trace in the output and exclude calls to code contained in library functions (e.g., "sqrt") in the stack trace from the output. Block 344 illustrates an example output that may be produced by applying a filter to the stack trace illustrated in block 340 or the output illustrated in block 342. In this example, the filter may include calls to code contained in "CalcSQRT" in the output and exclude calls to code contained elsewhere (such as, for example, in "sqrt" and "Test01") from the output.

Figure 3C:
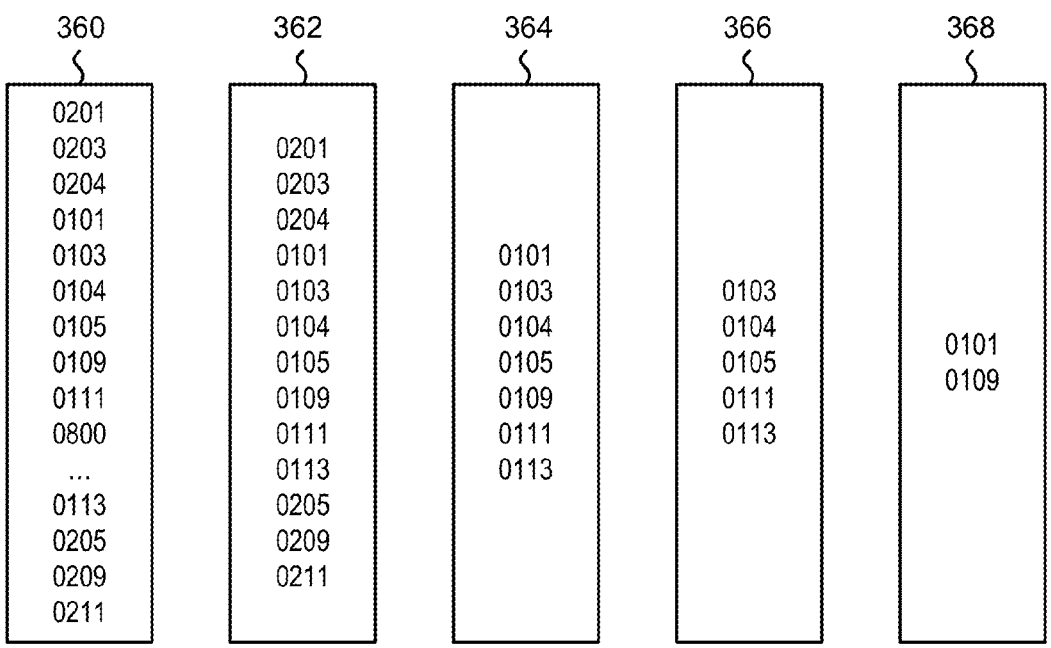

In FIG. 3C, block 350 illustrates code associated with a second version of function "CalcSQRT". The second version may be a successive version of the first version and may be created by altering the first version.

Referring to block 350, at line 0104, the value of the input parameter is assigned to a variable named "z". At line 0105, a check is performed to determine whether the value of variable "z" is less than zero. If so, at line 0107, a value of a variable named "y" is set to "−1". Otherwise, if the value of the variable "z" is not less than zero, at line 0111 library function "sqrt" is called to calculate the square root of the input parameter and the result is stored in variable "y". At line 0113, the value of the variable "y" is returned to a caller of the function.

Referring now to blocks 310 and 350, note that in block 350 the code at lines 0103, 0104, 0107, 0111, and 0113 has been added to the second version. Also note that in block 350, the code at line 0105 has been modified and the code at lines 0101 and 0109 has not changed from the first version.

Block 360 illustrates a path trace of an execution of the code in block 320 and the code in block 350. Note that the path trace indicates that lines 0103, 0104, and 0111 of the added code has been executed during the execution. Also note that the path trace indicates that lines 0101 and 0109 of the unmodified code and line 0105 of the modified code has been executed.

Blocks 362, 364, 366, and 368 illustrate outputs that may be generated from applying various filters to the path trace in block 360. Referring to block 362, the lines numbers contained therein may be identified by applying a filter that may include line numbers associated with code contained in blocks 320 and 350 and exclude line numbers associated with code not contained in these blocks (e.g., code associated with library routine "sqrt").

Block 364 illustrates an example of output that may be produced by applying a filter that includes line numbers associated with code contained in the second version of "CalcSQRT" and excludes line numbers associated with all other code listed in the path trace in block 360. Block 366 illustrates an example of output that may be produced by applying a filter that includes line numbers associated with code that has changed (e.g., modified, added) in the second version of "CalcSQRT". Block 368 illustrates an example of output that may be produced by applying a filter that includes line numbers associated with code that has not changed (e.g., has not been modified or added) in the second version of "CalcSQRT".

Note that the outputs in blocks 362, 364, 366, and 368 may be produced by applying filters directly to the stack trace illustrated in block 360 or cumulatively applying filters. An example of cumulatively applying a filter may include generating the output illustrated in block 366 by applying a filter to the output illustrated in block 364.

In FIG. 3D, block 370 illustrates an example of an interface that may be presented to a user to enable the user to select and/or configure a filter 371*a-c* that may be applied to information to produce an output. The filter may be used to include certain information in an output and/or exclude other information from the output. A report may be generated from the output produced by the filter.

Referring to block 370, filter 371*a* may be applied, for example, to information that contains call stack information to (1) include the call stack information in an output and (2) exclude information from the output that is not associated with the call stack. Filter 371*b* may applied, for example, to the information to (1) include call stack information associated with code that has been checked in (e.g., into VCS 138) and (2) exclude call stack information not associated with the code that has been checked in. Filter 371*c* may be applied, for example, to the information to (1) include call stack information associated with code that has changed since a last time that a test (e.g., that was run against a previous version of the code) has passed and (2) exclude call stack information that is not associated with code that has changed since the last time that the test passed.

Block 372 illustrates an example report that includes a status of various code that may be tested by a test. For example, line 373*a* indicates that a file named "thfoo" includes code that has not changed since the last time the test passed. Likewise, for example, line 373*b* indicates that a file named "hfoo" contains code that has changed since the last time the test passed. Note that the report illustrated in block 372 may be produced from output that may be generated by applying a filter to information associated with, for example, an execution of code.

Block 374 illustrates an example report that includes a trace of code that has been executed. The code may be executed, for example, by running a test, debugging a program, or otherwise executed. Block 378 illustrates names of files that contain the code illustrated in block 374. For example, the code at line 1 in block 374 includes the statement "function test=tfoo(point)". Block 378 indicates that this line of code may be found in a file named "tfoo.m". Further, block 378 indicates that this line of code may be found at line 1 in the file. Likewise, for example, the code at line 10 in block 374 includes the statement "if ischar (itemToFind)". Block 378 indicates that this line of code may be found in a file named "hfoo.m" at line 27.

In block 374 an indication may be provided to indicate statuses associated with the various code portions listed in the block 374. For example, code that has been tested but is not new may be indicated using a first indication (e.g., grayed out), code that has been tested and is new may be indicated using a second indication (e.g., colored blue), and a last line of code listed in block 374 that has been executed may be indicated using a third indication (e.g., colored red).

Note that other indications may be used to indicate various statuses associated with code presented in a report. These indications may include, for example, italics, colors, flashing, highlighting, underlining, and/or some other indication may be used to indicate various statuses. For example, a report may include a listing of code that is contained in a file. Code that has been executed (e.g., by a test, up to a breakpoint) may be indicated in the report using a first indication (e.g., a first color). Code that has not been executed may be indicated in the report using a second indication (e.g., grayed out). Code that is new that has been executed may be indicated in the report using a third indication (e.g., a second color) and code that is new and has not been executed may be indicated in the report using a fourth indication (e.g., annotated).

The indicated various statuses may include indications of coverage results, such as decision coverage. For example, suppose a conjunction of a first and second clause is evaluated, the first clause may be evaluated first. If the first clause evaluates to false, the second clause may not be evaluated (since the conjunction as a whole is false irrespective of the truth value of the second clause). Here, the first clause may be reported in a report differently than the second clause (e.g., by employing different colors).

Figure 4:
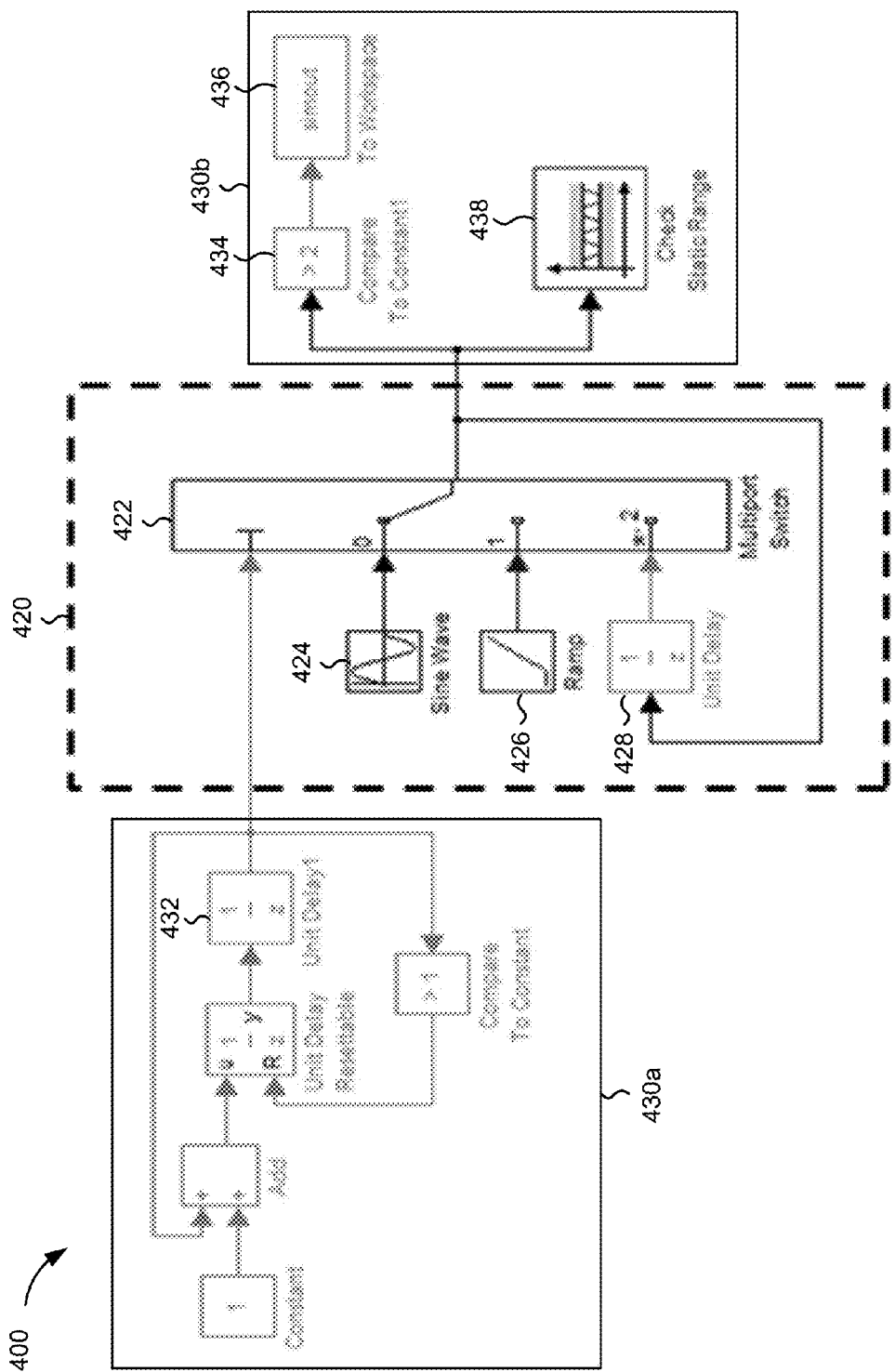
FIG. 4 illustrates example outputs that may be provided based on an analysis of information associated with a testing of a model having a multiport switch block.

FIG. 4 illustrates a block diagram 400 of an example of a model under test 420 and a test harness 430a-b. The model under test 420 may represent a system. Modeling elements included in the model under test 420 are enclosed in a rectangle with a dashed outline. The remaining modeling elements constitute the test harness 430a-b where the elements in test harness 430a may be used to generate inputs to the model under test 420 and the elements in test harness 430b may be used to evaluate outputs from the model under test 420. The model under test 420 may be an embodiment of UUT 250 and the test harness 430a-b may be an embodiment of test 240.

Operationally, elements in test harness 430a implement a periodic counter, which counts from zero to two in increments of one. The count is output by block 432 and input to the model under test 420. The model under test 420 includes a Multiport Switch block 422 that has the count as input. The value of the count is evaluated by the Multiport Switch block 422. If the value of the count is zero, the Multiport Switch block 422 outputs a signal generated by Sine Wave block 424. If the value of the count is one, the Multiport Switch block 422 outputs a signal generated by Ramp block 426. If the value of the count is two, the Multiport Switch block 422 outputs a signal generated by the Unit Delay block 428. Note that the output of the Unit Delay block 428 is a value of its input delayed by one time step, which in this example, is the output of the Multiport Switch block 422 at a previous time step.

Elements in test harness 430b include a Compare To Constant1 block 434 that checks whether the output of the model under test 420 exceeds a value of two. A result of this check is written to a logical workspace by a To Workspace block 436. Test harness 430b also includes a Check Static Range block 438 that may pause or stop the test if the model under test 420 produces an output that exceeds a lower or upper bound.

Suppose the model under test 420 is executed and produces an output that is outside of the range of values defined by the lower bound and the upper bound. Further suppose that while the Check Static Range block 438 is executing, it detects this condition. An indication may be provided in the block diagram 400 that indicates the Check Static Range block 438 was the last block that was executed when the condition was detected. This indication may include coloring the block 438 (e.g., in red), highlighting the block 438, providing an annotation in or near the block, or otherwise providing an indication of the detected condition.

Moreover, other indications may be provided in the block diagram 400 in response to detecting the condition. For example, suppose a prior version of the model under test 420 did not include the Ramp block 426 and an output from the Ramp block 426 caused the condition. An indication may be provided in the block diagram 400 that indicates the Ramp block 426 has been added to the model under test 420 since the prior version.

Other indications may include indicating elements of the model under test 420 and/or the test harness 430a-b that have been executed up to the detection of the condition. For example, in FIG. 4, a first indication (e.g., a first color) may be used to indicate the Check Static Range block 438 was the last block that was executed when the condition was detected. A second indication (e.g., a second color) may be used to indicate blocks that were executed prior to the Check Static Range block 438. A third indication (e.g., a third color) may be used to indicate blocks that were not executed. Moreover, an indication of a history may be provided in the block diagram 400. For example, an execution history of blocks executed in a predetermined number of most recent time steps (e.g., most recent five time steps) may be indicated in the block diagram by coloring only those blocks.

Figure 5A:
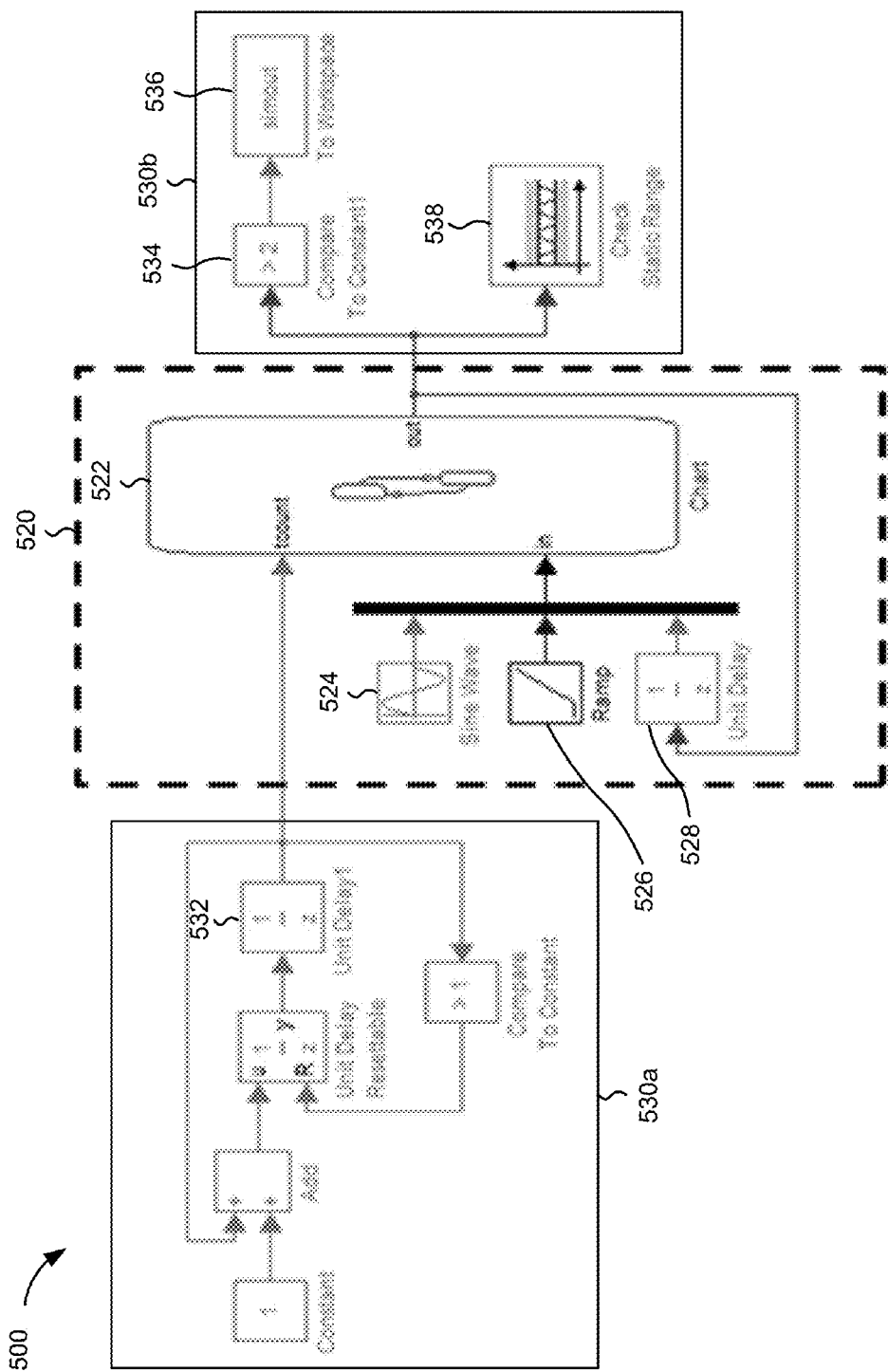
FIGS. 5A-B illustrate example outputs that may be provided based on an analysis of information associated with testing a model having a chart block.
Figure 5B:
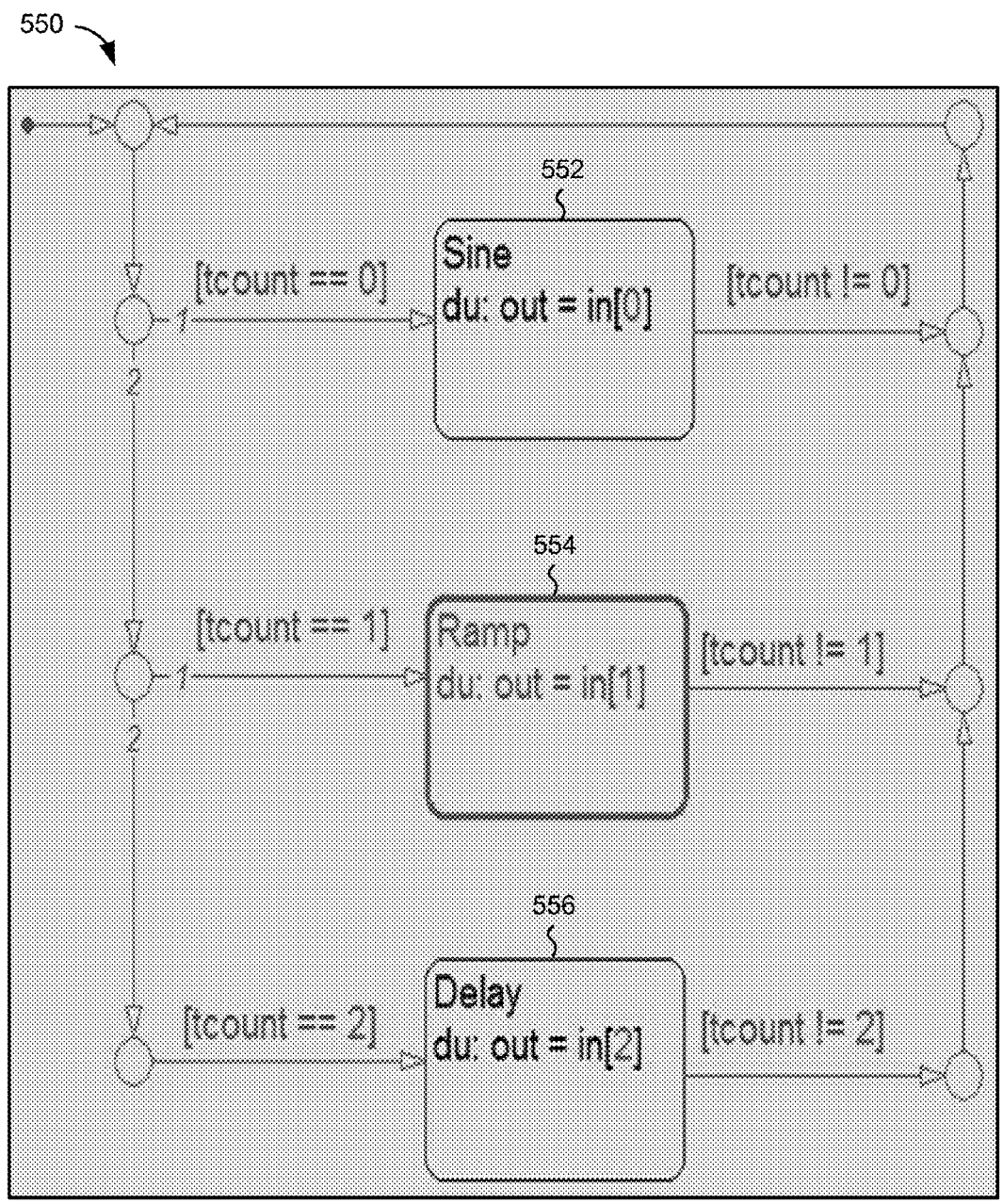

FIG. 5A illustrates a block diagram 500 of a model under test 520 that includes a Chart block 522 and a test harness 530a-b that may be used to test the model under test 520. FIG. 5B illustrates a chart 550 that may represent a behavior of the Chart block 522.

Operation of the test harness 530a-b is similar to the operation of the test harness 430a-b described above. Specifically, elements in test harness 530a implement a periodic counter, which counts from zero to two in increments of one. The count is output by block 532 and input to the model under test 520. The Chart block 522 has the count as input. The value of the count is evaluated by Chart block 522. If the value of the count is zero, the Chart block 522 outputs a signal generated by Sine Wave block 524. If the value of the count is one, the Chart block 522 outputs a signal generated by Ramp block 526. If the value of the count is two, the Chart block 522 outputs a signal generated by the Unit Delay block 528. The output of the Unit Delay block 528 is a value of its input delayed by one time step, which in this example, is the output of the Chart block 522 at a previous time step.

Elements in test harness 530b include a Compare To Constant1 block 534 that checks whether the output of the model under test 520 exceeds the value two. A result of this check is written to a logical workspace by a To Workspace block 536. Test harness 530b also includes a Check Static Range block 538 that may pause or stop the test if the model under test 520 produces an output that exceeds a lower or upper bound.

Referring now to FIG. 5B, the chart 550 includes three states, a Sine state 552, a Ramp state 554, and a Delay state 556. The states 552, 554, and 556 may determine which input of the chart 550 should be output from the Chart block 522. The input of the chart 550 is created by a multiplex block that includes an array with three elements. The first element ('in[0]') contains an output of the Sine Wave block 524, the second element ('in[1]') contains an output of the Ramp block 526 and the third element ('in[2]') contains an output of the Unit Delay block 528.

As noted above, the output of test harness 530a is input into Chart block 522. In chart 550 this input is associated with a variable named "tcount". If the value of "tcount" equals zero ('tcount==0') the chart enters a state labeled "Sine". While in this state, the Chart block 522 outputs the output of the Sine Wave block 524. If the value of "tcount" equals one ('tcount=1') the chart 550 enters a state labeled "Ramp". While in this state, the Chart block 522 outputs the output of the Ramp block 526. If the value of "tcount" equals two ('tcount=2') the chart 550 enters a state labeled "Unit Delay". While in this state, the Chart block 522 outputs the output of the Unit Delay block 528.

The chart 550 exits a state if the entry condition for that state is no longer satisfied. After exiting a state, the chart 550 may enter a state for which the entry condition is satisfied. For example, suppose that test harness 530*a* outputs the value zero. This value satisfies the entry condition for the Sine state and the chart 550 remains in this state until a different value is output from the test harness 530*a*. Now suppose the test harness 530*a* outputs the value one. The chart 550 exits the Sine state and enters the Ramp state whose entry condition (i.e., 'tcount=1') is now satisfied.

An execution of the model under test 520 may be stopped or paused based on a breakpoint. For example, a breakpoint may be set to pause execution when the Ramp state is active. Referring to FIGS. 5A-B, an indication may be provided in block diagram 500 and/or chart 550 to indicate when the Ramp state is active and/or that it is the current state of the chart 550 when execution is paused. The indication may include model elements and/or paths associated with the paused execution.

For example, the indication may include coloring the Ramp block 526, the Chart block 522, and/or paths associated with these blocks 526, 522 in block diagram 500. Note that other indications, associated with the paused execution, may be provided. For example, Chart block 522 may be annotated or colored a different color than the Ramp block 526 to indicate that the Ramp block 526 was the block being executed when the execution of the model under test 520 paused. Likewise, for example, Ramp state 554 in chart 550 may be colored to indicate that the Chart block 522 was in the Ramp state 554 when the execution of the model under test 520 paused.

Blocks in a model may be implemented as objects having one or more class functions. Examples of class functions may include JAVA methods, MATLAB language methods (including static methods), C# methods, and C++ member functions (including static member functions). After the occurrence of an event (e.g., a breakpoint, exception condition, detection of an error) a list may be presented (e.g., displayed) that may list functions associated with the event. As a further example, Sine state 552 may be indicated as a state that was previously active before the Ramp state 554 became active.

Figure 6:
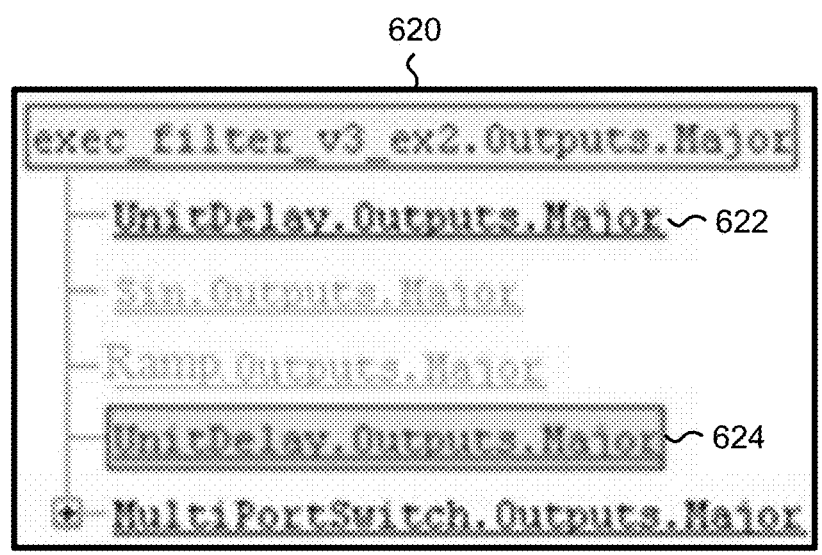
FIG. 6 illustrates an example output that may be provided based on an analysis of information associated with an occurrence of an event during an execution of a model under test.

For example, FIG. 6 illustrates an example list 620 of functions associated with an object that may be presented (e.g., displayed) after the occurrence of an event during an execution of model under test 420 (FIG. 4). Referring to FIG. 6, the list 620 includes names of classes associated with various objects and functions that may be associated with the objects. The objects may implement various blocks in the model under test 420. These names include the name "UnitDelay.Outputs.Major", which is a name of a function associated with an object of a class named "UnitDelay" that may implement block 432. Likewise, the functions named "Sin.Outputs.Major", "Ramp.Outputs.Major", the second function named "UnitDelay.Outputs.Major", and "MultiPortSwitch.Outputs.Major" are names of functions that belong to objects of classes named "Sin", "Ramp", "UnitDelay", and "MultiPortSwitch", respectively. These objects may implement blocks 424, 426, 428, and 422 respectively.

Note that an indication 622 is provided in the list 620 for the "UnitDelay.Outputs.Major" function associated with the object that implements block 428. The indication 622 may be used to indicate that this function was called when the execution paused. The indication 622 may be provided, for example, by coloring the text "UnitDelay.Outputs.Major", associated with the function, in the list 620 using a particular color (e.g., blue).

Also note that a different indication 624 is provided in the list 620 for the "UnitDelay.Outputs.Major" function associated with an object that implements block 432. This indication 624 may indicate that the function was called during the execution of the model under test 420. The indication 624 may be provided, for example, by highlighting the text "UnitDelay.Outputs.Major" in the list 620 that is associated with the function. Note that the above conditions may be indicated in the list 620 in other ways. For example, notations, underlining, blinking, or some other indication may be used to indicate one or more of the above conditions.

Figure 7:
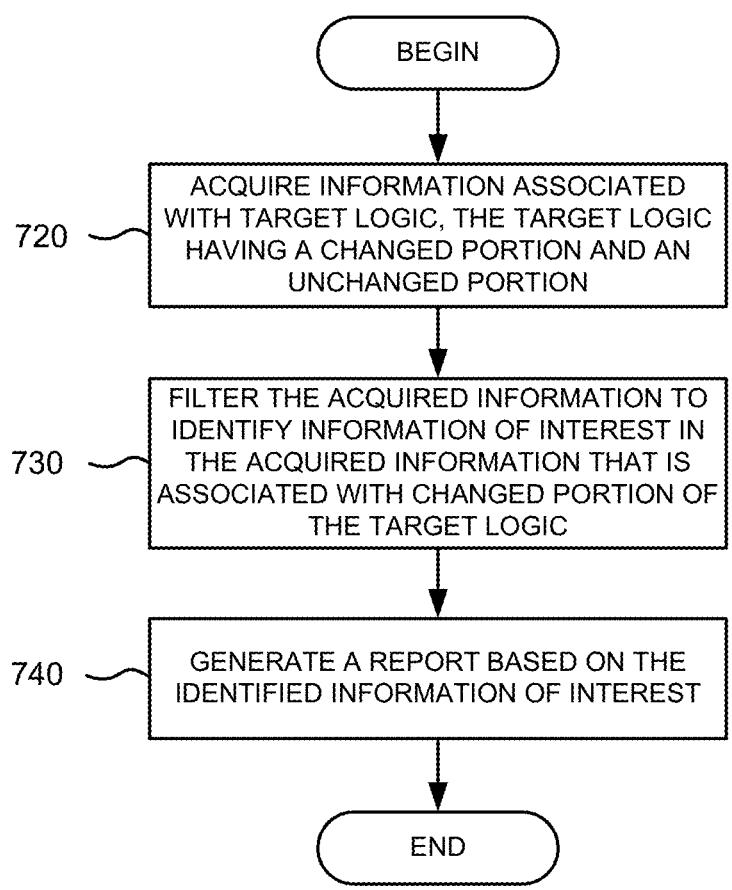
FIG. 7 illustrates a flowchart of example acts that may be used to generate a report.

FIG. 7 illustrates a flowchart of example acts that may be used to generate a report. Referring to FIG. 7, at block 720 information associated with target logic is acquired. The target logic may include, for example, modeling logic. The modeling logic may be part of a model of a system and may include model elements (e.g., blocks of the model), code, or other logic. The target logic may be targeted for analysis, testing, and/or other processing. For example, the target logic may include modeling logic that is targeted for testing.

The information may be associated with an execution of the target logic. For example, the information may include a path trace, a stack trace, or other information that may be associated with an execution of the target logic, for example, such as described above.

The information may include a condition associated with a changed portion of the target logic and/or a condition associated with an unchanged portion of the target logic. The condition associated with the changed portion may include an indication of a path in the changed portion that is executed (e.g., during an execution of a test of the target logic). Moreover, the condition associated with the changed portion may include, for example, an error condition, a warning condition, or an exception condition that occurred in response to an execution of the changed portion.

The information may include a stack trace of a plurality of functions called during the execution of the changed portion of the target logic. The stack trace may include an indication that a function associated with the changed portion of the target logic was called during the execution of the test.

The changed portion may be maintained in a version control system, such as VCS 168. The version control system may contain a first indication that indicates the changed portion of the modeling logic has been added to the target logic, deleted from the target logic, or modified in the target logic. The version control system may also contain a second indication that indicates a prior execution of the test occurred against an earlier version of the target logic. The second indication may include a time stamp (e.g., date and/or time) of when the execution of the test occurred. The changed portion of the target logic may be identified based on the first indication and the second indication.

For example, the first indication may include a time stamp when a portion of logic was added to or modified in the target logic. Likewise, the second indication may include a time stamp when the prior execution of a test of the target logic occurred. The TCE 200 may identify the changed portion by comparing the time stamp for the portion of added, deleted, or modified logic with the time stamp for the prior execution of the test and if the time stamps indicate that the portion of added, deleted, or modified logic occurred after the prior execution of the test, the TCE 200 may treat the portion of the added, deleted, or modified logic as the changed portion of the target logic.

At block 720, the information may or may not be generated based on a testing of the target logic. For example, the information may be generated from a static and/or dynamic analysis of the target logic. The analysis may or may not include testing the target logic.

The information may be acquired, for example, by reading the information from storage, such as secondary storage 150 (FIG. 1), receiving the information via an input device, such as input device 160, receiving the information via a communication interface, such as communication interface 180, or otherwise acquiring the information.

At block 730, the acquired information is filtered to identify information of interest in the acquired information. For example, the target logic may include code and the information may include a path trace of code that was executed during a test of the target logic. The path trace may contain line numbers associated with the code that was executed during the test. The information of interest may be line numbers associated with code that has been changed (e.g., added to, deleted from, and/or modified in the target logic) since a prior execution of the test to test an earlier version of the target logic. A filter may be applied to the path trace to identify this information of interest in the path trace. The filter may involve querying a VCS, such as VCS 138, to identify the changed code and/or code that was not changed.

At block 740, a report is generated based on the identified information of interest. The report may include, for example, some or all of the information of interest that has been identified at block 730. Moreover, the report may include other information, such as information that may not be identified as information of interest. The other information may be presented differently in the report than the information of interest. For example, the information identified as information of interest may be highlighted and the information that is not identified as information of interest may be grayed-out or not be presented. Note that other ways of presenting information in the report may be used.

Likewise, for example, presenting the changed portion of the target logic differently than the unchanged portion may include a visual indication of the target object that indicates the changed portion of the target logic has been (1) added to the target logic since the prior execution of the test, (2) deleted from the target logic since the prior execution of the test, or (3) modified in the target logic since the prior execution of the test. In addition, the visual indication may include an indication that the unchanged portion of the target logic has not been (1) added to the modeling logic since the prior execution of the test, (2) deleted from the target logic since the prior execution of the test, or (3) modified in the modeling logic since the prior execution of the test.

Figure 8:
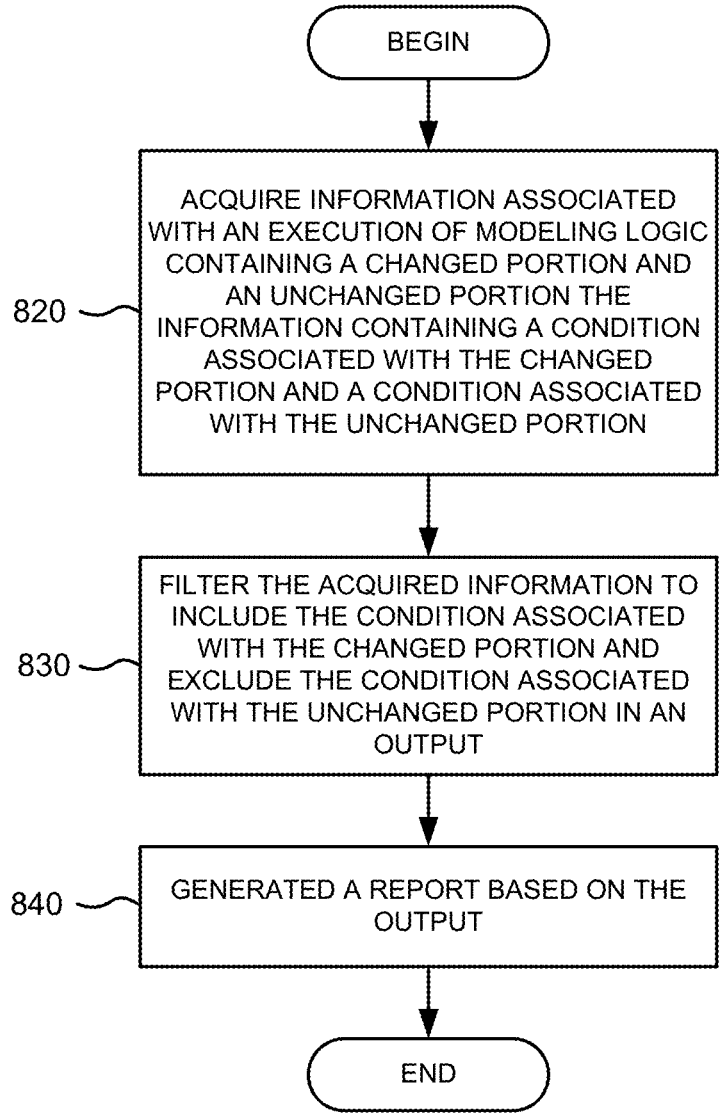
FIG. 8 illustrates a flowchart of example acts that may be used to generate a report associated with modeling logic.

FIG. 8 illustrates a flowchart of example acts that may be used to generate a report associated with modeling logic that, for example, has changed. Referring to FIG. 8, at block 820 information associated with an execution of modeling logic is acquired. The information may be associated with an execution of the modeling logic. The modeling logic may be executed during the course of an execution of a test that is used to test the modeling logic. For example, during the execution of the test, the test may call portions of the modeling logic, such as described above, to execute those portions.

The modeling logic may include, for example, model elements, code, and/or other logic, as described above. The modeling logic may contain a changed portion and an unchanged portion. The changed portion may include modeling logic that has been added to, deleted from, and/or modified in a prior version of the modeling logic. The changed portion may have been added to, deleted from, and/or modified in the prior version of the modeling logic since a prior execution of the above-described test to test the prior version of the modeling logic.

For example, the above-described test may be executed to test a first version of the modeling logic. Afterwards, logic may be added to, deleted from, and/or modified in the modeling logic to create a second version of the modeling logic. The added, deleted, and/or modified logic may be considered the changed portion. Note that the changed portion includes logic that has been added to, deleted from, and/or modified in the modeling logic since the execution of the test against the first version of the modeling logic.

The information may contain a condition associated with the changed portion and a condition associated with the unchanged portion. Examples of conditions for the changed and/or unchanged portion may include error conditions (e.g., incorrect result, scheduling overruns), warning conditions (e.g., overflow of a variable with a fixed point data type), exception conditions, breakpoint taken, breakpoint not taken, a function called (e.g., as exemplified in a stack trace), a code path taken (e.g., as exemplified in a path trace), or other condition.

For example, the information may include a stack trace of a plurality of functions called during an execution of a test that tests the modeling logic. A condition included in the information may include an indication (e.g., a name of a function associated with the changed portion) in the stack trace that a function associated with the changed portion of the modeling logic was called during the execution of the test.

Likewise, for example, the condition associated with change portion of the modeling logic may include an indication of a path in the changed portion of the modeling logic that has been executed (e.g., by a test that tests the changed portion of the modeling logic).

At block 830, the acquired information is filtered to include the condition associated with the changed portion and exclude the condition associated with the unchanged portion in an output. For example, the conditions in the information may relate to a path taken by an execution of code. The information may be filtered to (1) exclude path information associated with non-user specified code (e.g., library functions supplied by a vendor) and/or test harness code, and (2) include path information associated with user specified code that has changed with respect to a previous version of the code. Code that has been changed may be, for example, maintained in a VCS, such as VCS 138, and may be identified by querying the VCS.

At block 840, a report is generated based on the output. The report may include information contained in the output. Moreover, the report may include information not contained in the output. For example, the output may include path information associated with user-specified code that has changed, as described above. The report may include this information as well as path information associated with user-specified code that has not changed. The path information associated with user-specified code that has changed may be, for example, presented differently in the report than the path information associated with user-specified code that has not changed.

The report may provide an indication of the condition associated with the portion of the modeling logic that has changed in a representation of the modeling logic. For example, the modeling logic may be visually presented as a block diagram. A condition associated with a portion of the modeling logic that has changed may be presented in the block diagram differently (e.g., using coloring, visual cues, text, animation) than a portion of the modeling logic that is not associated with the condition. Further, an indication of the condition (e.g., text describing the condition) may be reported (e.g., in a pop-up window) when the portion of the modeling logic has been selected (e.g., by hovering a cursor over the portion).

The following example may be helpful in understanding the above. Referring to FIGS. 1, 2, 3A, 3C, and 8, suppose, for example, that TCE 200 executes the code in block 320 to test the code in block 350 (FIG. 3C). Further suppose that the code in block 310 is a previous version of the code in block 350, that versions of the code are maintained in VCS 138, and that the path trace in block 360 is generated as a result of the execution.

TCE 200 may acquire the path trace, such as described above. Note that the path trace includes line numbers associated with changed (e.g., added, deleted, modified) code in block 350 and line numbers associated with unchanged code in block 350.

Now suppose a filter is defined (e.g., by a user, such as described above) that when applied to the path trace in block 350 outputs line numbers associated with portions of the code that has changed since a previous version of the code. TCE 200 may apply the filter to the acquired path trace to produce an output (block 830). In applying the filter, TCE 200 may query VCS 138 to identify code that has changed and code that has not changed.

The output produced by applying the filter may include line numbers associated with code that has changed since the previous version of the code and exclude line numbers associated with code that is unchanged since the previous version of the code, such as illustrated in block 366. TCE 200 may then generate a report based on the output (block 840). The report may include information contained in the output and information not contained in the output, for example, such as described above.

Figure 9:
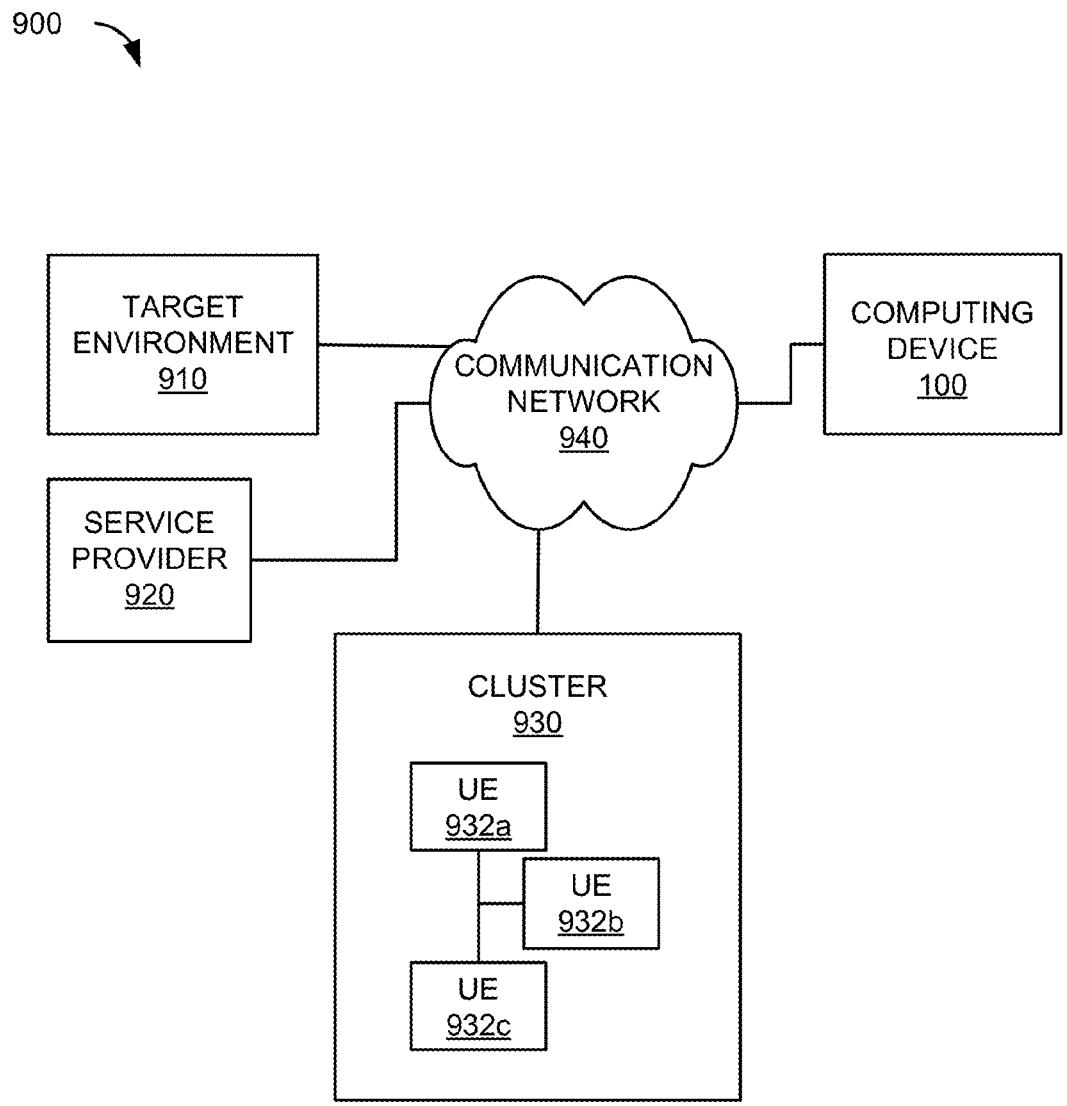
FIG. 9 illustrates an example of a distributed system that may implement one or more embodiments of the invention.

One or more embodiments of the invention may be implemented in a distributed environment. FIG. 9 illustrates an example of a distributed environment 900 that may implement one or more embodiments of the invention. Referring to FIG. 9, environment 900 may contain various components including computing device 100, target environment 910, service provider 920, cluster 930, and communication network 940. Note that the distributed environment 900 is just one example of a distributed environment that may be used with one or more embodiments of the invention. Other distributed environments that may be used with one or more embodiments of the invention may contain more components or fewer components than illustrated in FIG. 9. Moreover, the components in the distributed environments may be arranged differently than the arrangement shown in FIG. 9. In addition, the distributed environments may implement various "cloud computing" frameworks.

Details of computing device 100 were described above with respect to FIG. 1. In distributed environment 900, computing device 100 may, among other things, exchange information (e.g., data) with other components in the communication network 940 (e.g., target environment 910, service provider 920, and cluster 930). Computing device 100 may interface with the communication network 940 via a communication interface 180.

Target environment 910 may interpret and/or execute, for example, one or more embodiments of the invention, which may be generated in or otherwise made available to the distributed environment 900. The communication network 940 may include digital and/or analog aspects. Information exchanged in communication network 940 may include machine-readable information having a format that may be used, for example, in the communication network 940 and/or with one or more components in the communication network 940.

For example, the information may be encapsulated in one or more packets that may be used to transfer the information through the communication network 940. Information may be exchanged between components in the communication network 940 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), IEEE 802.11, or other communication protocol.

The communication network 940 may comprise various network devices, such as gateways, routers, switches, firewalls, servers, repeaters, address translators, etc. Portions of the communication network 940 may be wired (e.g., using wired conductors, optical fibers) and/or wireless (e.g., using free-space optical (FSO), radio frequency (RF), acoustic transmission paths). Portions of the communication network 940 may include a substantially open public network, such as the Internet. Portions of the communication network 940 may include a more restricted network, such as a private corporate network or virtual private network (VPN). It should be noted that implementations of communication networks and/or devices operating on communication networks described herein are not limited with regards to, for example, information carried by the communication networks, protocols used in the communication networks, and/or the architecture/configuration of the communication networks.

Cluster 930 may include a number of units of execution (UEs) 932*a*-*c* that may execute or interpret one or more embodiments of the invention or portions thereof on behalf of computing device 100 and/or another component, such as service provider 920. The UEs 932*a*-*c* may reside on a single device or chip or on multiple devices or chips. For example, the UEs 932*a*-*c* may be implemented in a single ASIC or in multiple ASICs. Likewise, the UEs 932*a*-*c* may be implemented in a single computer system or multiple computer systems. Other examples of UEs 932*a*-*c* may include, for example, some combination of FPGAs, CPLDs, ASIPs, processors, multiprocessor systems-on-chip (MPSoCs), graphic processing units, and/or microprocessors. The UEs 932*a*-*c* may perform operations on behalf of another component in the distributed environment 900. For example, in an embodiment, the UEs 932*a*-*c* may execute portions of code associated with the TCE 200. Here, TCE 200 may dispatch certain activities pertaining to one or more embodiments of the invention to the UEs 932*a*-*c* for execution. The service provider 920 may configure cluster 930 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 7 and 8, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, embodiments of the invention may be stored in one or more non-transient tangible computer-readable storage media and may include computer-executable instructions that may be executed by processing logic, such as processing logic 120. The computer-executable instructions may include instructions that implement one or more embodiments of the invention. The non-transient tangible computer-readable storage media may be volatile or nonvolatile and may include, for example, flash memories, dynamic memories, memristor memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. One or more non-transitory computer-readable storage media for storing computer-executable instructions executable by a processor, the instructions comprising:
   one or more instructions that, when executed by the processor, cause the processor to:
   interact with information associated with an execution of a test that is used to test modeling logic,
   the modeling logic containing a changed portion and an unchanged portion,
   the information including:
   first information that indicates that the changed portion includes code that has been added to the modeling logic, deleted from the modeling logic, or modified in the modeling logic since a prior execution of the test that tested an earlier version of the modeling logic,
   a first condition associated with the changed portion, and
   a second condition associated with the unchanged portion,
   the modeling logic being used to model a system;
   identify the changed portion of the modeling logic based on the first condition and the second condition; and
   modify the information to:
   include the first condition in an output in a first format, and
   include the second condition in the output in a second format that is different than the first format.

2. The media of claim 1, wherein the instructions further comprise:
   one or more instructions that, when executed by the processor, cause the processor to:
   provide for presentation the first condition in the output with an indication, and
   provide for presentation the second condition in the output without the indication,
   the indication including at least one of italicized text, colored text, flashing text, highlighted text, or underlined text.

3. The media of claim 1, wherein the information includes a stack trace of a plurality of functions called during the execution of the test, and wherein the first condition is an indication in the stack trace that a function associated with the changed portion of the modeling logic was called during the execution of the test.

4. The media of claim 1, wherein the first condition includes an indication of a path in the changed portion of the modeling logic that is executed during the execution of the test.

5. The media of claim 1, wherein the first condition includes an error condition or an exception condition that occurs based on an execution of the changed portion of the modeling logic during the execution of the test.

6. The media of claim 1, wherein the first condition is provided for presentation in the output via a first indication that includes at least one of:
   italicized text,
   colored text,
   flashing text,
   highlighted text, or
   underlined text.

7. The media of claim 6, wherein the first condition is provided for presentation in the output via a second indication indicating that the prior execution of the test occurred.

8. The media of claim 1, where the instructions further comprise:
   one or more instructions that, when executed by the processor, cause the processor to:
   modify the information to:
   emphasize the first condition in the output, and
   deemphasize the second condition in the output.

9. The media of claim 1, where the instructions further comprise:
   one or more instructions that, when executed by the processor, cause the processor to:
   provide for presentation the changed portion of the modeling logic in a first visual manner and the unchanged portion of the modeling logic in a second visual manner, the second visual manner being different than the first visual manner.

10. The media of claim 1, where the instructions further comprise:
    one or more instructions that, when executed by the processor, cause the processor to:
    include the output in a visual indication of the modeling logic.

11. The media of claim 10, wherein in the instructions further comprise:

one or more instructions that, when executed by the processor, cause the processor to:
provided for presentation the changed portion of the modeling logic differently than the unchanged portion of the modeling logic in the visual indication.

12. A method comprising:
interacting with information associated with an execution of a test that is used to test target logic,
the target logic including a changed portion and an unchanged portion,
the information including:
information that indicates that the changed portion includes code that has been added to the target logic, deleted from the target logic, or modified in the target logic since a prior execution of the test that tested an earlier version of the target logic,
a first condition associated with the changed portion, and
a second condition associated with the unchanged portion, and
the interacting being performed by a device;
identifying the changed portion of the target logic based on the first condition and the second condition,
the identifying being performed by the device; and
modifying the information to:
include the first condition in an output in a first format, and
include the second condition in the output in a second format that is different than the first format,
the modifying the information being performed by the device.

13. The method of claim 12, wherein the first condition is provided for presentation in the output via a first indication that includes at least one of:
italicized text,
colored text,
flashing text,
highlighted text, or
underlined text.

14. The method of claim 13, wherein the first condition is provided for presentation in the output via a second indication indicating that the prior execution of the test occurred.

15. The method of claim 12, wherein the method further comprises:
modifying the information to:
emphasize the first condition in the output, and
deemphasize the second condition in the output.

16. The method of claim 12, further comprising:
providing for presentation the output in a visual indication of the target logic,
the changed portion of the target logic being provided for presentation differently in the visual indication than the unchanged portion of the target logic.

17. The method of claim 16, wherein the changed portion of the target logic is provided for presentation differently in the visual indication than the unchanged portion of the target logic based on:
the first condition associated with the changed portion of the target logic, and
the second condition associated with the unchanged portion of the target logic.

18. One or more non-transitory computer-readable storage media for storing computer-executable instructions executable by a processor, the instructions comprising:
one or more instructions that, when executed by the processor, cause the processor to:
interact with a trace associated with an execution of code in a program that is executed during a testing of the code,
the program including a changed portion and an unchanged portion;
apply a filter to the trace to identify:
a portion of the trace that indicates that the changed portion includes code that has been added to the program, deleted from the program, or modified in the program since a prior execution of the test that tested an earlier version of the program,
a first condition associated with the changed portion, and
a second condition associated with the unchanged portion;
identify the changed portion of the program based on the first condition and second condition; and
modify the trace to:
include the first condition in an output in a first format, and
include the second condition in the output in a second format that is different than the first format.

19. The media of claim 18, wherein the first condition is provided for presentation in the output via a first indication that includes at least one of:
italicized text,
colored text,
flashing text,
highlighted text, or
underlined text.

20. The media of claim 18, where the instructions further comprise:
one or more instructions that, when executed by the processor, cause the processor to:
provide, for display, the portion of the trace differently than remaining portions of the trace.

* * * * *

UNITED STATES PATENT AND TRADEMARK OFFICE
CERTIFICATE OF CORRECTION

| | |
|---|---|
| PATENT NO. | : 9,678,718 B1 |
| APPLICATION NO. | : 13/316233 |
| DATED | : June 13, 2017 |
| INVENTOR(S) | : Joseph Bienkowski et al. |

It is certified that error appears in the above-identified patent and that said Letters Patent is hereby corrected as shown below:

Please correct Claim 11 as follows:

Column 22, Line 66, change "wherein in the instructions" to --wherein the instructions--

Column 23, Line 3, change "provided for presentation" to --provide for presentation--

Signed and Sealed this
Fifth Day of September, 2017

Joseph Matal
*Performing the Functions and Duties of the*
*Under Secretary of Commerce for Intellectual Property and*
*Director of the United States Patent and Trademark Office*